United States Patent
Kim (10) Patent No.: US 8,355,760 B2
(45) Date of Patent: Jan. 15, 2013

(54) PORTABLE TERMINAL HAVING REINFORCEMENT MEMBER

(75) Inventor: Sang-Hyeon Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1269 days.

(21) Appl. No.: 11/923,637

(22) Filed: Oct. 24, 2007

(65) Prior Publication Data

US 2008/0146293 A1   Jun. 19, 2008

(30) Foreign Application Priority Data

Dec. 14, 2006   (KR) .................. 10-2006-0127966

(51) Int. Cl.
    *H04M 1/00* (2006.01)
(52) U.S. Cl. .................... 455/575.1; 455/550
(58) Field of Classification Search ................. 361/703, 361/752; 455/90.3, 347, 550.1, 556.1, 575.1
    See application file for complete search history.

(56) References Cited

U.S. PATENT DOCUMENTS

| | | | | |
|---|---|---|---|---|
| 5,436,088 A * | 7/1995 | Castaneda et al. | ............... | 429/96 |
| 6,101,372 A * | 8/2000 | Kubo | ............... | 455/558 |
| 6,463,263 B1 * | 10/2002 | Feilner et al. | ................ | 455/90.1 |
| 6,480,397 B1 * | 11/2002 | Hsu et al. | ................ | 361/814 |
| 2001/0049292 A1 * | 12/2001 | Strawn et al. | ................ | 455/550 |
| 2003/0153356 A1 | 8/2003 | Liu | | |
| 2004/0080916 A1 | 4/2004 | Hsu et al. | | |
| 2005/0014537 A1 * | 1/2005 | Gammon et al. | ......... | 455/575.1 |
| 2005/0181843 A1 * | 8/2005 | Tsujimoto | ............... | 455/575.1 |
| 2006/0176014 A1 * | 8/2006 | Moon | ................ | 320/112 |
| 2007/0190829 A1 * | 8/2007 | Tu et al. | ................ | 439/136 |
| 2008/0048360 A1 * | 2/2008 | Wang | ................ | 264/259 |

FOREIGN PATENT DOCUMENTS

JP   10-162796 A   6/1998

* cited by examiner

*Primary Examiner* — Wesley Kim
*Assistant Examiner* — Dinh P Nguyen
(74) *Attorney, Agent, or Firm* — Jefferson IP Law LLP (57) ABSTRACT

A portable terminal is provided. The terminal includes a reinforcement member mounted in a housing of the portable terminal, a plurality of coupling pieces, a removable cover member, and a plurality of coupling grooves corresponding to the plurality of coupling pieces, in which a battery pack mounted in the housing is interposed between the removable cover member and the reinforcement member. The width of a coupling structure required for securing a coupling force for the removable cover member can be reduced by at least about 10% when compared to a conventional coupling structure, thereby securing a strong coupling force and contributing to expansion of a battery capacity for a portable terminal having a specific size.

17 Claims, 6 Drawing Sheets

PORTABLE TERMINAL HAVING REINFORCEMENT MEMBER

PRIORITY

This application claims the benefit under 35 U.S.C. §119 (a) of a Korean patent application filed in the Korean Intellectual Property Office on Dec. 14, 2006 and assigned Serial No. 2006-127966, the entire disclosure of which is hereby incorporated by reference.

BACKGROUND OF THE INVENTION

1. Field of the Invention

The present invention generally relates to a portable terminal. More particularly, the present invention relates to a coupling structure between cases of a housing of the portable terminal.

2. Description of the Related Art

Generally, the term "portable terminal" refers to an apparatus which provides radio communication between users and service providers via a mobile communication base station. Various forms of contents such as a voice communication service, a short message service, a mobile banking service, a television (TV) service, an on-line game service, and an on-demand video service are provided to users using portable terminals.

Conventional portable terminals may be classified in various types according to their appearance. For example, portable terminals may be classified as bar-type terminals, flip-type terminals, and folder-type terminals according to their appearance. In a bar-type terminal, input/output devices such as a communication circuit, transmitting unit and receiving unit are mounted in a single housing. In a flip-type terminal, a flip cover is mounted in the bar-type terminal. In a folder-type terminal, a pair of housings are opened and closed through rotation and input/output devices are arranged on the pair of housings. Recently, a sliding-type terminal has been developed to improve portability and convenience and to satisfy various user preferences together with the folder-type terminal.

In consideration of portability, much effort has been made to miniaturize a portable terminal by reducing the length width, and thickness of the portable terminal. Recently, however, a large screen is required to provide a multimedia service using the portable terminal, resulting in limitations in reducing the length or width of the portable terminal. Thus, efforts to miniaturize the portable terminal have been concentrated on making the portable terminal slim by reducing the thickness of the portable terminal.

In a slim terminal, a problem may occur in securing battery capacity. In other words, the batter capacity may be limited due to a limitation in securing the volume of a battery pack.

Moreover, a conventional portable terminal is manufactured such that a battery pack including a rechargeable battery is mounted in the terminal after being accommodated in a separate housing or the battery pack is accommodated in a housing of the terminal and then protected by a cover member. Such a battery pack mounting structure requires much space on the housing of the terminal to secure its coupling means. In particular, when the battery pack is accommodated in the separate housing, its coupling means must be sufficiently solid to resist the load of the housing and the battery pack, thus requiring more space.

As a result, the coupling means provided for mounting the battery pack in the slim structure hinders the battery capacity from being secured. Moreover, since the load of the battery pack constitutes a significant proportion of the entire load of the slim terminal, the terminal is likely to be damaged such as the shape transformation of the terminal by an external shock.

SUMMARY OF THE INVENTION

An aspect of the present invention is to address at least the above-mentioned problems and/or disadvantages and to provide at least the advantages described below. Accordingly, an aspect of the present invention is to provide a portable terminal having a reinforcement member, in which the solidity of the slim portable terminal is secured, thereby improving the shock resistance of the terminal.

Another aspect of the present invention is to provide a portable terminal having a reinforcement member in which a battery mounting structure occupies a small space and has a stable coupling structure, thereby contributing to expansion of battery capacity.

Another aspect of the present invention is to provide a portable terminal having a reinforcement member, in which a battery mounting structure can provide a stable coupling force.

According to one aspect of the present invention, a portable terminal is provided. The terminal includes a reinforcement member mounted in a housing of the portable terminal, a plurality of coupling pieces, a removable cover member, and a plurality of coupling grooves corresponding to the plurality of coupling pieces, in which a battery pack mounted in the housing is interposed between the removable cover member and the reinforcement member.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiment described herein can be made without departing from the scope and spirit of the invention. Also, descriptions of well-known functions and constructions are omitted for clarity and conciseness.

Figure 1:
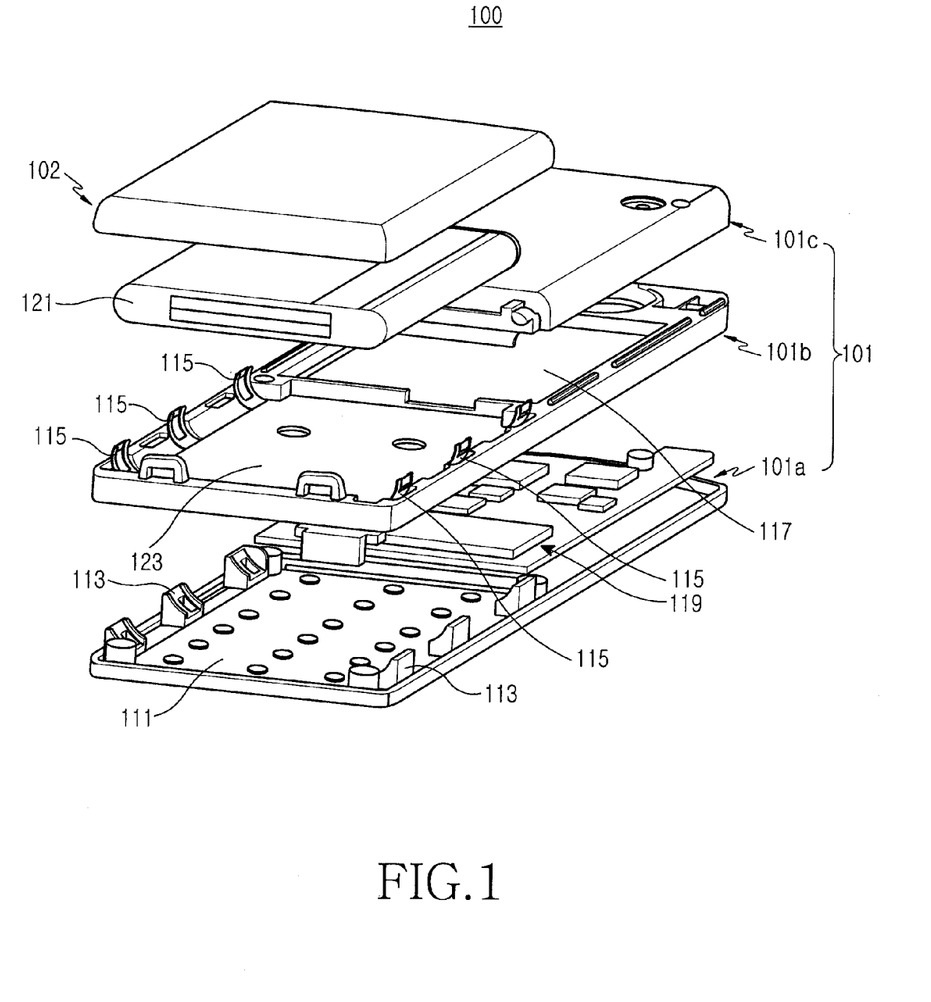
FIG. 1 is an exploded perspective view of a portable terminal having a reinforcement member according to an exemplary embodiment of the present invention.
Figure 2:
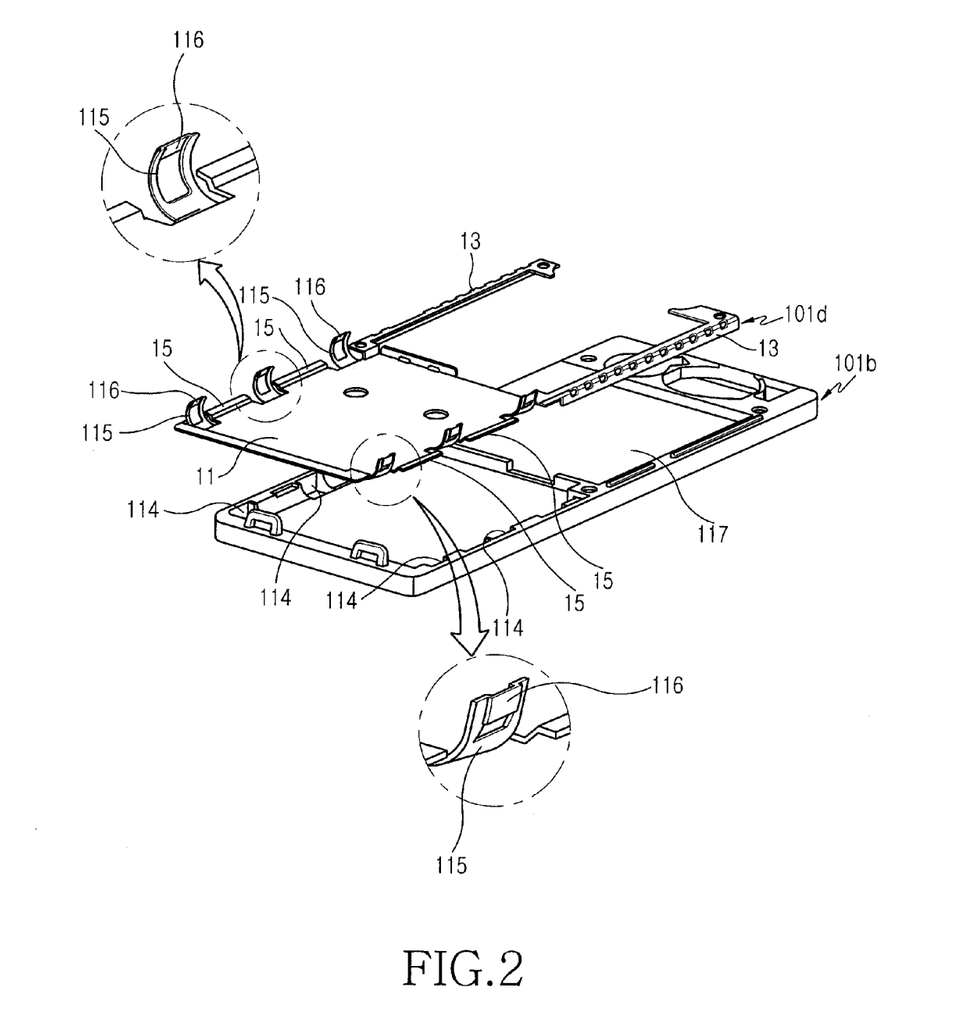
FIG. 2 is an exploded perspective view of an exemplary middle case illustrated in FIG. 1.

FIG. 1 is an exploded perspective view of a portable terminal having a reinforcement member according to an exemplary embodiment of the present invention As illustrated in FIGS. 1 and 2, a portable terminal 100 comprises a bar type mobile phone. The portable terminal includes a reinforcement member 101d having a plurality of coupling pieces 115 formed therein, mounted in a middle case 101b of a housing 101, thereby providing a coupling means of a cover means 102 and reinforcing the solidity of the housing 101.

The housing 101 includes a front case 101a and a rear case 101c, and the middle case 101b is interposed between the front case 101a and the rear case 101c in such a way to close a portion of the front case 101a.

A portion of the front case 101a is opened to a front surface of the housing 101 in order to provide a space for a screen of a display device (riot shown) installed in the front case 101a and the remaining portion of the front case 101a provides a space for a keypad. A main board 119 is installed in the opened portion of the front case 101a. Circuit devices for performing and controlling the overall functions of the portable terminal 100 such as a communication circuit, a memory, and a signal processor are installed in the main board 119 and the display device is installed in one surface of the main board 119.

The middle case 101b is installed in a rear surface of the front case 101a in order to close a portion of the front case 101a where the keypad is installed, and an opening 117 is formed in another portion of the front case 101a to accommodate the main board 119.

The rear case 101c is mounted in the middle case 101b to close the remaining portion of the front case 101a where the main board 119 is installed. In other words, the rear surface 101c closes the opening 117 of the middle case 101b. Thus, the remaining portion of the middle case 101b is kept exposed to the outside on the housing 101.

The remaining portion of the middle case 101b kept exposed to the outside on the housing 101 provides a battery mounting surface 123. In other words, a battery pack 121 of the portable terminal 100 is mounted on the battery mounting surface 123, and the cover member 102, which is removable, mounted on the housing 101 closes the battery mounting surface 123 or the battery pack 121 mounted on the battery mounting surface 123 for protection.

FIG. 2 is an exploded perspective view for illustrating a mounting structure of the reinforcement member 101d that provides a coupling means of the cover member 102 and reinforces the solidity of the housing 101 of the portable terminal 100, in which the reinforcement member 101d is separated from the middle case 101b.

Referring to FIGS. 1 and 2, the reinforcement member 101d may be made of a metal material and is mounted in the middle case 101b that is positioned in a middle portion of the housing 101. In an alternative embodiment, the reinforcement member 101d may be made of a rigid plastic or other rigid material. While the reinforcement member 101d and the middle case 101b are separated from each other in FIG. 2, the reinforcement member 101d may also be mounted in the middle case 101b simultaneously with molding of the middle case 101b by means of double injection.

For example, the reinforcement member 101d may be molded by press-forming a metal board and can be mounted in the middle case 101b made of synthetic resin simultaneously with molding of the middle case 101b by means of double injection.

The reinforcement member 101d includes a battery mounting unit 11 in a flat-board form, which is positioned in a portion where the battery pack 121 is mounted, and a pair of reinforcement units 13 extending from the battery mounting unit 11. The pair of reinforcement units 13 extend from one end of the battery mounting unit 11 in parallel with each other and are positioned inside both side edges of the middle case 101b.

When the reinforcement member 101d is mounted in the middle case 101b by double injection, the battery mounting unit 11 is accommodated within the middle case 101b in a position corresponding to the battery mounting surface 123 and the pair of reinforcement units 13 are disposed in such a way to surround the opening 117 of the middle case 101b. Thus, when a bending force is applied to the housing 101 of the portable terminal 100, the reinforcement member 101d can provide a resistance force for maintaining the shape of the housing 101 against the applied bending force.

To strongly couple the reinforcement member 101d to the middle case 101b, support ribs 15 extend to outside from the reinforcement member 101d, more specifically between the plurality of coupling pieces 115. When synthetic resin for molding the middle case 101b is solidified in such a way as to surround the reinforcement member 101d, the support ribs 15 are strongly engaged with the side edges of the middle case 101b.

When the reinforcement member 101d is mounted in the middle case 101b, it can provide a means for mounting the middle case 101b in the front case 101a. As mentioned above, the reinforcement member 101d can be made of a metal or other rigid material. By forming the reinforcement member 101d made of a rigid material and provides a screw hole (not shown) penetrating the middle case 101b, the middle case 101b can be engaged with the front case 101a using the screw. The middle case 101b made of synthetic resin may be transformed or damaged by the engagement force of the screw. However, if a portion of the middle case 101b is removed to expose the reinforcement member 101d, the exposed portion of the reinforcement member 101d supports the screw, thereby preventing damage to the middle case 101b.

The plurality of coupling pieces 115 are formed in the battery mounting unit 11 of the reinforcement member 101d. Three pairs of the plurality of coupling pieces 115 each extend from both side ends of the battery mounting unit 11 in such a way as to be bent in a curve form and face each other. A plurality of coupling protrusions 116 are formed on an outer side surface of each coupling piece 115. When the battery pack 121 is positioned on the battery mounting surface 123, the plurality of coupling pieces 115 surround both side surfaces of the battery pack 121.

When the reinforcement member 101d is mounted in the middle case 101b, the plurality of coupling pieces 115 are positioned in support holes 114 formed in the middle case 101b in such a way as to protrude from the rear surface of the middle case 101b. When positioned in the support holes 114, the plurality of coupling pieces 115 accumulate elastic forces by being transformed to move towards their facing pieces. The elastic forces accumulated in the plurality of coupling pieces 115 work in such a direction to move the plurality of coupling pieces 115 away from each other.

A plurality of support units 113 formed in the front case 101a provide coupling forces between the front case 101a and the middle case 101b and maintain the shape of the plurality of coupling pieces 115. Referring to FIG. 1, the plurality of support units 113 are formed in the rear surface of the front case 101a in order to be engaged with the support holes 114 of the middle case 101b. The plurality of support units 113 support the outer side surfaces of the plurality of coupling pieces 115 while being engaged with the support holes 114, thereby maintaining the shape of the plurality of coupling pieces 115.

The battery mounting surface 123 provides the space for mounting the battery pack 121, and the front surface of the middle case 101b facing the battery mounting surface 123 faces the space for mounting the keypad of the portable terminal 100. Thus, the keypad installed in the front case 101a is supported by the surface facing the battery mounting surface 123 while facing the middle case 101b.

Figure 3:
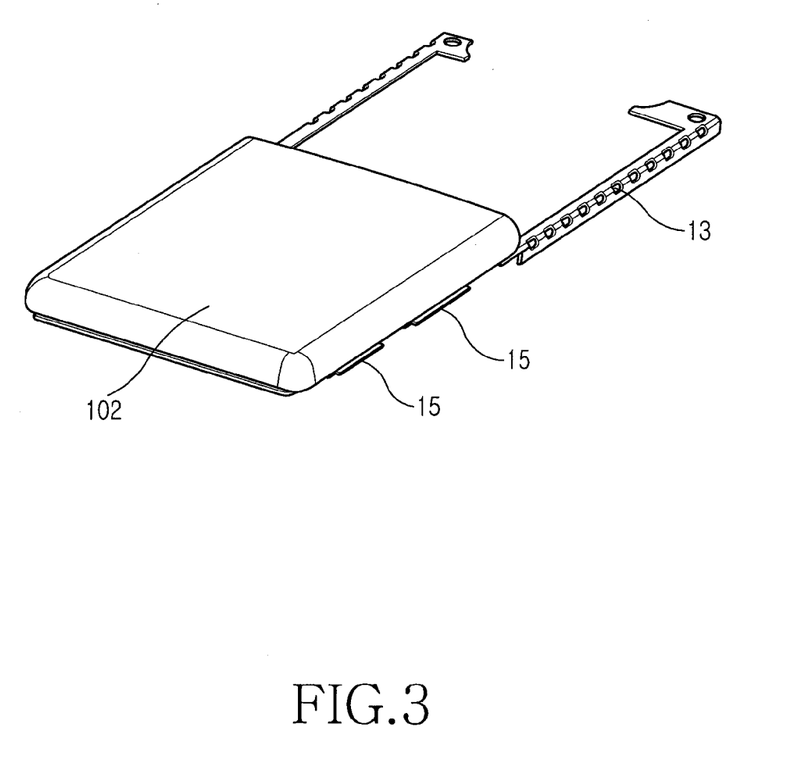
FIG. 3 is a perspective view illustrating a state where a cover member is coupled to a reinforcement member illustrated in FIG. 2.
Figure 4:
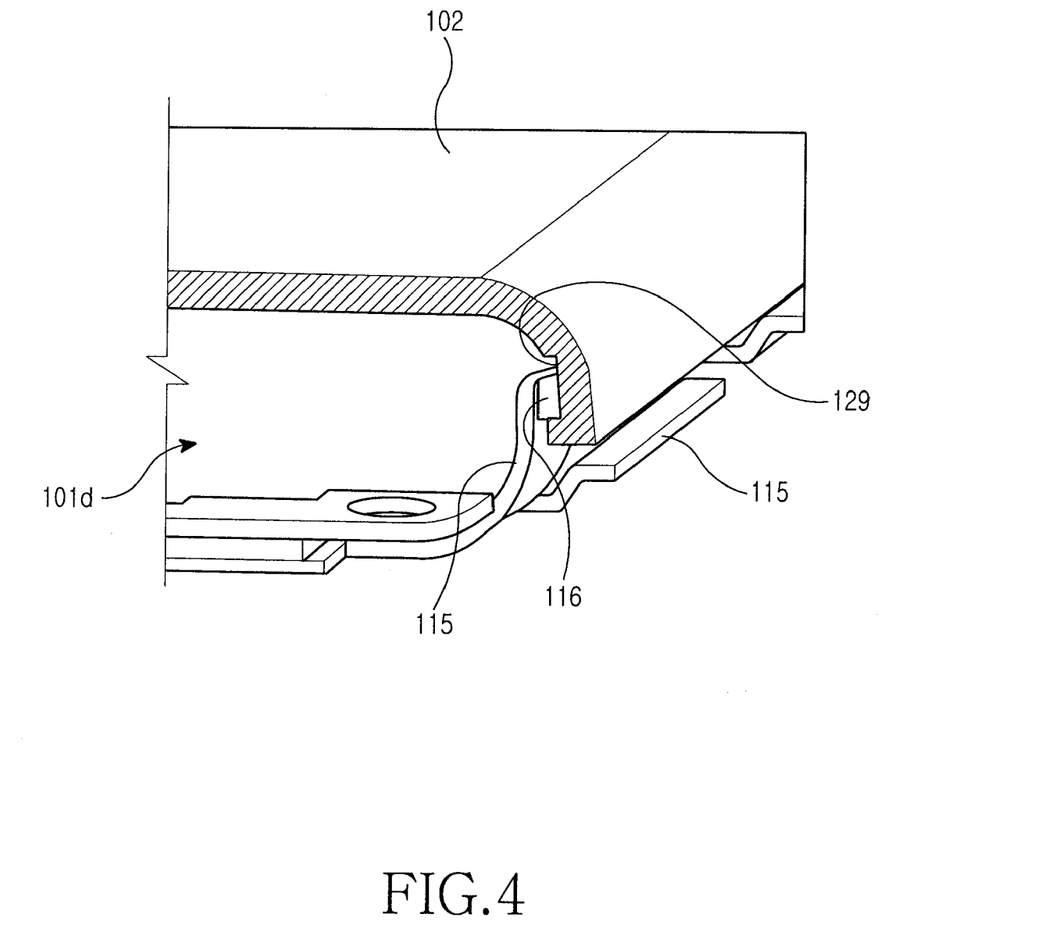
FIG. 4 is a partial-cut perspective view of the cover member and the reinforcement member illustrated in FIG. 3.
Figure 5:
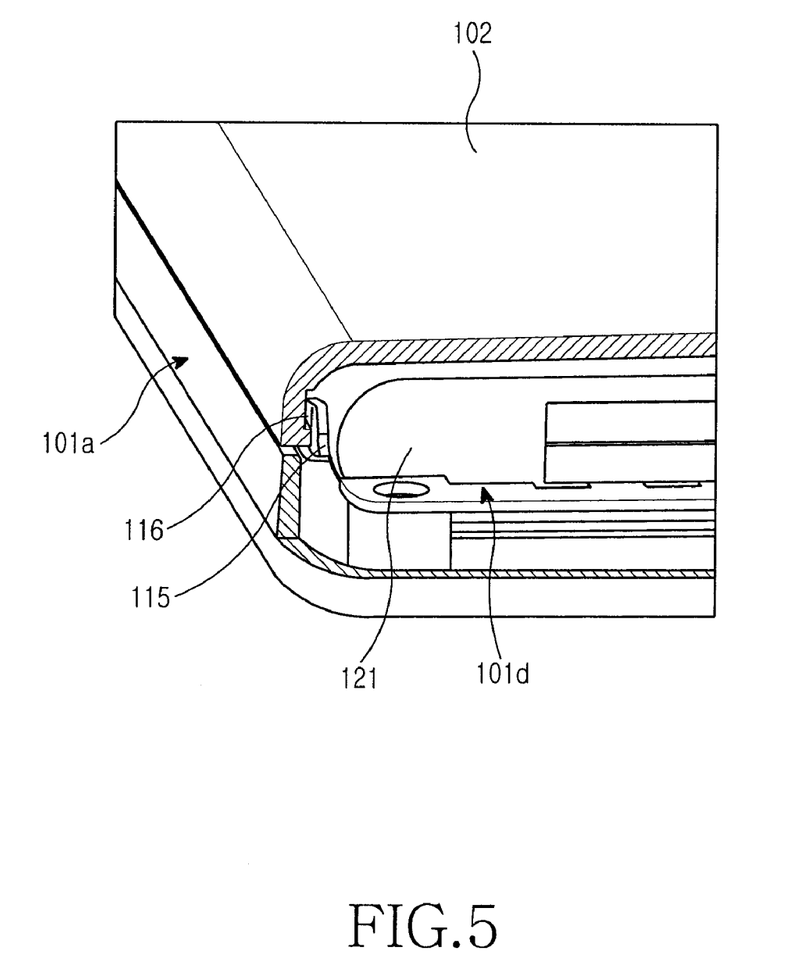
FIG. 5 is a partial-cut perspective view illustrating a state where the cover member is coupled to a housing of the portable terminal illustrated in FIG. 1.
Figure 6:
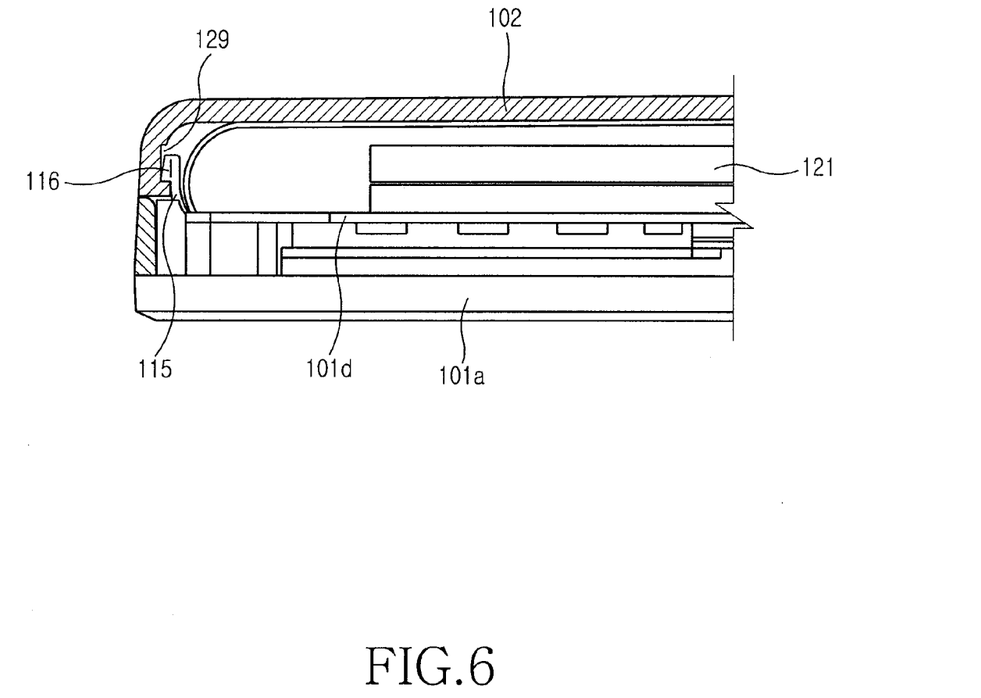
FIG. 6 is a cross-sectional view of the portable terminal illustrated in FIG. 5.

FIGS. 3 and 4 illustrate a state where the cover member 102 is coupled to the reinforcement member 101d, and FIG. 5 illustrates a state where the cover member 102 mounted in the middle case 101b is coupled to the reinforcement member 101d.

Referring to FIGS. 3 through 5, a plurality of coupling grooves 129 are formed in positions corresponding to the plurality of coupling pieces 115 in both inner side faces of the cover member 102 and are engaged with the plurality of coupling protrusions 116.

When the cover member 102 is coupled to the housing 101 in a state where the battery pack 121 is positioned in the battery mounting surface 123, the battery pack 121 is interposed between the cover member 102 and the reinforcement member 101d, more specifically the middle case 101b.

The plurality of coupling pieces 115 or the plurality of coupling grooves 129 are positioned adjacent to each other with a predetermined interval therebetween in both side edges of the housing 101. Thus, when the cover member 102 is mounted in the housing 101, the plurality of coupling pieces 115 and the plurality of coupling grooves 129 can prevent a crack between the cover member 102 and the housing 101. The cover member 102 is made of a rigid material such as a metal using press forming and may be plated or painted for elegant appearance or harmonization with the appearance of the housing 101.

The cover member 102 partially surrounds both side surfaces and lower end surface of the housing 101, and completely closes the rear surface of the housing 101 together with the rear case 101c once being mounted in the housing 101. When the cover member 102 is coupled to the housing 101, the plurality of coupling protrusions 116 are engaged with the plurality of coupling grooves 129 and the plurality of coupling pieces 115 are transformed to move towards each other. Thus, the plurality of coupling pieces 115 presses both inner side surfaces of the cover member 102 by means of the accumulated elastic forces. In other words, the elastic forces accumulated in the plurality of coupling pieces 115 press the cover member 102 towards the outer side of the housing 101 via the plurality of coupling pieces 115.

When the plurality of coupling protrusions 116 are engaged with the plurality of coupling grooves 129 formed in the inner side surface of the cover member 102, the plurality of coupling pieces 115 press the inner side surface of the cover member 102 so that the plurality of coupling protrusions 116 can be stably kept engaged with the plurality of coupling grooves 129.

The portable terminal 100 including the reinforcement member 101d structured as above can reduce the width of the coupling means of the cover member 102, which is removable for protection of the battery pack 121, and improve physical characteristics of the housing 101 such as shock resistance.

Generally, a coupling structure of a portable terminal where a battery pack is accommodated in a terminal housing and a cover member is removable occupies a smaller space than that of a portable terminal where a battery pack is accommodated in a separate battery housing and the battery housing is removable in a terminal housing. When a battery pack and a cover member are separately removable in a terminal housing, a coupling structure can provide a sufficient coupling force only when a width of about 2 mm to 3.8 mm from one side of the terminal housing is secured. When such a coupling structure is provided in both sides of the terminal housing, a minimum of about 4 mm and a maximum of about 7.6 mm are required.

The coupling structure of the cover member 102 using the reinforcement member 101d according to an exemplary embodiment of the present invention can secure a sufficient coupling force between the reinforcement member 101d and the cover member 102 by setting the thickness of the cover member 102 to about 0.88 mm, the depth of the plurality of coupling grooves 129 formed by cutting both side ends of the cover member 102 to about 0.35 mm, and the thickness of the plurality of coupling piece 115 to about 0.4 mm. In this coupling structure, an interval of about 0.08 mm may be maintained between the plurality of coupling pieces 115 and the battery pack 121, thereby preventing the plurality of coupling pieces 115 from directly contacting the battery pack 121.

For example, the coupling structure between the reinforcement member 101d and the cover member 102 has a width of about 1.71 mm in a side of the housing 101, i.e., a width of about 3.42 mm in both sides of the housing 101, which is smaller by about 0.58 mm than the minimum width of about 4 mm required in a coupling structure of a cover member of a general portable terminal.

In application to an actual product, it is possible to secure a sufficient coupling force between the reinforcement member 101d and the cover member 102 and the sufficient solidity of the cover member 102 for protecting the battery pack 121 even when the thickness of the cover member 102 is reduced up to about 0.7 mm, the depth of the plurality of coupling grooves 129 is reduced up to about 0.15 mm from the inner side surface of the cover member 102, and the thickness of the plurality of coupling pieces 115 is reduced up to about 0.3 mm.

As described above, the portable terminal including the reinforcement member according to exemplary embodiments of the present invention can strongly fix the cover member for protecting the battery pack. Moreover, the width of the coupling structure required for securing a coupling force for the cover member can be reduced by at least about 10% when compared to a conventional coupling structure, thereby contributing to expansion of a battery capacity for the terminal having a specific size. Furthermore, for the terminal having the battery pack with a specific capacity, the terminal can be miniaturized by reducing the width of the terminal.

The reinforcement member is easy to manufacture because it is made of a rigid material such as a metal by means of press forming the middle case of the terminal housing simultaneously with molding, and the shock resistance of the terminal housing may be improved by reinforcing the solidity of the middle case.

While the invention has been shown and described with reference to exemplary embodiments thereof, it will be understood by those skilled in the art that various changes in form and details may be made therein without departing from the spirit and scope of the invention as defined by the appended claims and their equivalents.

What is claimed is:

1. A portable terminal, comprising:
a reinforcement member mounted in a housing of the portable terminal and including a plurality of coupling pieces; and
a removable cover member including a plurality of coupling grooves corresponding to the plurality of coupling pieces,
wherein a battery pack mounted in the housing is interposed between the removable cover member and the reinforcement member,
wherein the housing comprises:
a front case;
a middle case mounted in a rear face of the front case to close at least one portion of the front case; and
a rear case mounted in a rear face of the middle case to close the remaining portion of the front case, and
wherein the reinforcement member comprises:
a battery mounting unit positioned in a position where the battery pack is mounted; and
a pair of reinforcement units extending from the battery mounting unit and positioned inside at least two side edges of the middle case.

2. The portable terminal of claim 1, wherein the plurality of coupling pieces extend from side ends of the reinforcement member and are bent to face each other such that the plurality of coupling pieces surround at least two side surfaces of the battery pack.

3. The portable terminal of claim 1, wherein the plurality of coupling pieces each comprises coupling protrusion that protrudes from an outer side surface of each of the coupling pieces, and the plurality of coupling protrusions are engaged with the plurality of coupling grooves.

4. The portable terminal of claim 3, wherein the thickness of the removable cover member is between about 0.7 mm and about 0.88 mm.

5. The portable terminal of claim 3, wherein the thickness of each of the plurality of coupling grooves is between about 0.15 mm and about 0.35 mm from an inner side surface of the removable cover member.

6. The portable terminal of claim 3, wherein the thickness of each of the plurality of coupling pieces is between about 0.3 mm and about 0.4 mm.

7. The portable terminal of claim 1, wherein the reinforcement member comprises at least one of a metal material and a plastic material and is mounted in the middle case simultaneously with molding of the middle case by means of double injection.

8. The portable terminal of claim 1, wherein the coupling pieces extend from at least two side ends of the battery mounting unit.

9. The portable terminal of claim 1, wherein the removable cover member is mounted in the middle case to close a rear face of the housing together with the rear case.

10. The portable terminal of claim 1, further comprising:
a main board mounted in the front case; and
an opening formed in the middle case to accommodate the main board,
wherein the rear case closes the opening.

11. The portable terminal of claim 10, wherein the reinforcement member comprises:
a battery mounting unit positioned in a position where the battery pack is mounted; and
a pair of reinforcement units extending from the battery mounting unit and positioned inside at least two side edges of the middle case,
wherein the pair of reinforcement units are positioned to surround at least two side edges of the opening.

12. The portable terminal of claim 11, further comprising a keypad installed in the housing, wherein one surface of the battery mounting unit is positioned in a surface facing the battery pack and the other surface of the battery mounting unit is positioned in a surface supporting the keypad.

13. The portable terminal of claim 1,
wherein the reinforcement member is made of a metal material, is mounted in the middle case simultaneously with molding of the middle case by means of double injection, and is engaged with the front case by a screw, thereby mounting the middle case in the front case.

14. The portable terminal of claim 13, further comprising at least one support rib extending to outside from the reinforcement member, wherein the at least one support rib is engaged with an edge portion of the middle case.

15. The portable terminal of claim 13, further comprising:
a plurality of support holes formed in the middle case; and
a plurality of support units formed in the front case,
wherein the plurality of support units are engaged with the plurality of support holes, the plurality of coupling pieces are positioned in the plurality of support holes, and the plurality of support units support an outer side surface of each of the plurality of coupling pieces in the plurality of support holes.

16. The portable terminal of claim 1, wherein the plurality of coupling grooves are formed in inner surfaces of the removable cover member.

17. The portable terminal of claim 16, wherein the plurality of coupling pieces comprise a plurality of coupling protrusions that protrude from an outer side surface of each of the plurality of coupling pieces, and the plurality of coupling protrusions are positioned in the plurality of coupling grooves and the plurality of coupling pieces press an inner side surface of the removable cover member in a direction towards outside of the housing when the removable cover member is mounted in the housing.

* * * * *